: 2,807,645

PROCESS FOR THE PRODUCTION OF 1-p-NITRO-PHENYL - 2 - DICHLOROACETAMIDOPROPANE-1,3-DIOLS

George W. Moersch, Detroit, Mich., assignor to Parke, Davis & Company, Detroit, Mich., a corporation of Michigan No Drawing. Application September 24, 1952, Serial No. 311,335

7 Claims. (Cl. 260—562)

This invention relates to a new process for the production of 1-p-nitrophenyl-2-dichloroacetamidopropane-1,3-diols having the formula

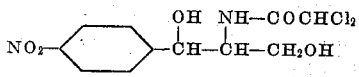

It is known that the reaction of imino alkyl ethers of formula

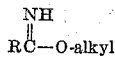

where R is a substituted or unsubstituted alkyl or aryl radical, with a 1-p-nitrophenyl-2-aminopropane-1,3-diol leads to the formation of a mixture of the corresponding Δ²-oxazolines having the formulae

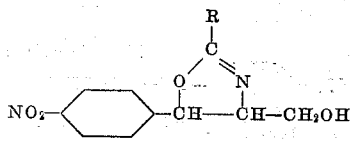

and

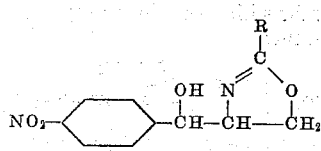

or to either one or the other of these Δ²-oxazolines. (See, for example, U. S. Patent No. 2,562,114.) Dichloroacetimino alkyl ethers have been employed in the reaction to produce a mixture of the corresponding 2-dichloromethyl Δ²-oxazolines which have the formulae

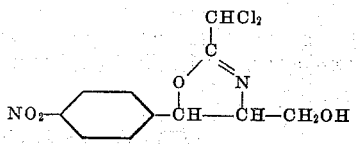

and

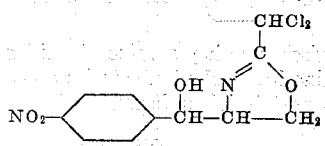

However, it has been found that by carrying out the reaction between the dichloroacetimino alkyl ether and the 1-p-nitrophenyl-2-aminopropane-1,3-diol under certain special conditions that the reaction produces a 1-p-nitrophenyl-2-dichloroacetamidopropane-1,3-diol rather than the expected mixture of Δ²-oxazolines. This is particularly surprising in view of the fact that under the same special reaction conditions other imino alkyl ethers such as acetimino alkyl ethers, benzimino alkyl ethers and the like produce only Δ²-oxazoline products.

In accordance with the invention, 1-p-nitrophenyl-2-dichloroacetamidopropane-1,3-diols are produced by reacting a dichloroacetimino alkyl ether or acid addition salt thereof with an acid addition salt or the free base of 1-p-nitrophenyl-2-aminopropane-1,3-diol, respectively, in organic solvent containing at least one equivalent of water.

As organic solvents, lower aliphatic alcohols, cyclic ethers, lower alkyl esters of lower fatty acids and mixtures of the same with non-polar solvents such as ethers, aromatic hydrocarbons, aliphatic hydrocarbons and the like can be employed in the process. Some specific examples of such solvents are methyl alcohol, ethyl alcohol, isopropyl alcohol, ethyl acetate, dioxane, tetrahydrofurane, benzene-ethyl alcohol mixture, ether-ethyl alcohol mixture and the like.

The process is carried out at a temperature below about 50° C. and preferably at a temperature between 20 and 35° C. The time required for the reaction varies somewhat with the temperature but, in general, the reaction is usually complete within about six to ten hours.

The maximum amount of water which can be used in the process is not particularly critical but as a practical matter it is usually confined to below about a ten-fold excess of that required. When larger amounts are utilized the solubility of the reactants and the final product in the organic solvent are appreciably decreased, and this necessitates the use of larger quantities of the organic solvent. Best results are obtained when the water content of the organic solvent is maintained below about 20%.

The relative quantities of the 1-p-nitrophenyl-2-aminopropane-1,3-diol and dichloroacetimino alkyl ether are not particularly critical, but for the sake of economy it is preferable to use at least one equivalent of the dichloroacetimino alkyl ether for each equivalent of the 1-p-nitrophenyl-2-aminopropane-1,3-diol.

The preferred method of carrying out the process is to employ the free base form of the 1-p-nitrophenyl-2-aminopropane-1,3-diol and a mineral acid salt of the dichloroacetimino alkyl ether. The process can also be carried out using the free base of the dichloroacetimino alkyl ether with a mineral acid salt of the 1-p-nitrophenyl-2-aminopropane-1,3-diol. However, the free bases of the dichloroacetimino alkyl ethers are relatively unstable and hence it is preferable to carry out the reaction using this reactant in its more stable salt form.

It will be appreciated by those skilled in the art that the 1-p-nitrophenyl-2-dichloroacetamidopropane-1,3-diols produced by the process of the invention as well as the 1-p-nitrophenyl-2-aminopropane-1,3-diols used as starting materials exist in diastereoisomeric and optically isomeric forms. These different isomers will be referred to herein as the D-threo, L-threo, D-erythro, L-erythro, DL-threo and DL-erythro forms. Where the formula or chemical name in the specification or claim refers to a particular isomer, the appropriate notation appears before the chemical name or below the formula. In the absence of such a notation the chemical name or formula is to be interpreted in its generic sense, that is, as applying to any of the aforementioned isomers.

The invention is illustrated by the following examples.

Example 1

4.0 g. of dichloroacetimino ethyl ether hydrochloride is added to 4.3 g. of D-(—)-threo-1-p-nitrophenyl-2-amino-propane-1,3-diol dissolved in 50 cc. of ethanol containing about 1% by volume of water. The solution is shaken for about three hours at room temperature (25° C.) and then allowed to stand overnight. The reaction mixture is filtered to remove the ammonium chloride (1.07 g.) and the filtrate evaporated to a pale yellow oil which solidifies on standing. The oily solid is washed with cold ethyl acetate and the insoluble white crystalline hydrochloride salt of D-(—)-threo-1-p-nitrophenyl-2-aminopropane-1,3-diol collected and dried. The ethyl acetate is distilled from the ethyl acetate extracts to obtain a light yellow oil which on standing crystallizes to a white solid; M. P. 140° C. The crude D-(—)-threo-1-p-nitrophenyl-2-dichloroacetamidopropane-1,3-diol so obtained is purified by recrystallization from ethylene dichloride; M. P. 150–1° C.; $(\alpha)_D^{25} = -25.5°$ in ethyl acetate. The formula of this product is:

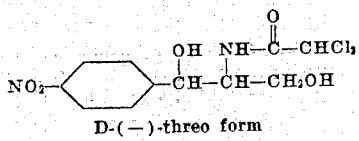

D-(—)-threo form

Example 2

5.5 g. of dichloroacetimino ethyl ether hydrochloride is added to 5 g. of L-(+)-threo-1-p-nitrophenyl-2-aminopropane-1,3-diol dissolved in a mixture composed of 95 cc. of ethanol and 5 cc. of water. The reaction mixture is allowed to stand at room temperature overnight with occasional shaking. The insoluble material, 550 mg. (500 mg. of ammonium chloride plus 50 mg. of unreacted amino diol), is removed by filtration and the filtrate diluted with an equal volume of anhydrous ether. The addition of the ether causes the separation of a further 800 mg. of ammonium chloride which is removed by filtration. The filtrate is evaporated in vacuo to a thick syrup. The addition of water to the residual syrup produces a yellow oily material which soon crystallizes. The insoluble L-(+)-threo-1-p-nitrophenyl-2-dichloroacetamidopropane-1,3-diol so obtained is collected and purified by recrystallization from aqueous methanol; M. P. 150–1° C.; $(\alpha)_D^{25} = +25.5°$ in ethyl acetate. The formula of this product is:

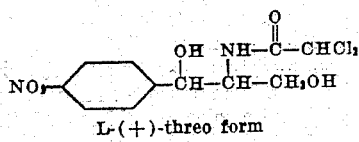

L-(+)-threo form

Example 3

10 g. of dichloroacetimino methyl ether hydrochloride is added to 10 g. of DL-threo-1-p-nitrophenyl-2-aminopropane-1,3-diol dissolved in a mixture composed of 250 cc. of methanol and 10 cc. of water. The reaction mixture is stirred at room temperature (25° C.) for ten hours and then diluted with an equal volume of anhydrous ether. The precipitate is separated and discarded. The filtrate is evaporated in vacuo to a thick syrup and the residual syrup stirred with 50 cc. of water. The crystalline DL-threo-1-p-nitrophenyl-2-dichloroacetamidopropane-1,3-diol which separates is collected and purified by recrystallization from aqueous methanol; M. P. 150° C. The formula of this product is:

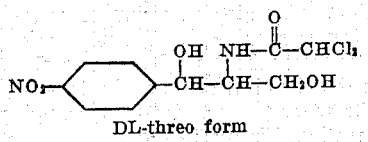

DL-threo form

Example 4

6.0 g. of dichloroacetimino ethyl ether hydrochloride is suspended in 100 cc. of cold benzene and an equivalent amount of sodium bicarbonate in 15 cc. of ice water added. The mixture is shaken vigorously for several minutes and the benzene layer separated. The benzene solution of the free base of dichloroacetimino ethyl ether thus obtained is added to 5.2 g. of D-(—)-threo-1-p-nitrophenyl-2-aminopropane-1,3-diol hydrochloride dissolved in a solvent mixture composed of 240 cc. of ethanol and 8 cc. of water. The resulting mixture is shaken for about ten or twelve hours on a shaking machine and then the reaction mixture evaporated in vacuo to a thick syrup. 75 cc. of cold water is added to the residual syrup and the mixture stirred for a short time, which causes the desired D-(—)-threo-1-p-nitrophenyl-2-dichloroacetamidoproprane-1,3-diol to separate in crystalline form. The crude product is collected and purified by recrystallization from aqueous methanol; M. P. 150–1° C.; $(\alpha)_D^{25} = -25.5°$ in ethyl acetate.

Example 5

11 g. of dichloroacetimino ethyl ether hydrochloride is added to 10 g. of DL-erythro-1-p-nitrophenyl-2-aminopropane-1,3-diol dissolved in a mixture composed of 200 cc. of ethanol and 10 cc. of water. The reaction mixture is stirred for about ten hours at room temperature (about 25° C.) and then diluted with an equal volume of anhydrous ether. The insoluble material is collected and discarded. The filtrate is evaporated in vacuo to a thick syrup and the residue stirred with a small volume of water. The crystalline DL-erythro-1-p-nitrophenyl-2-aminopropane-1,3-diol which separates is collected and purified by recrystallization from ethanol-petroleum ether mixture; M. P. 172–3° C. The formula of this product is:

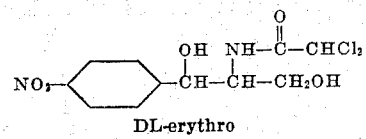

DL-erythro

What I claim is:

1. Process for the production of a 1-p-nitrophenyl-2-dichloroacetamidopropane-1,3-diol of formula

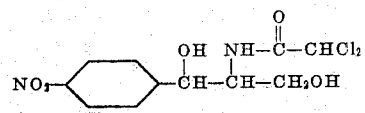

which comprises reacting a dichloroacetimino lower alkyl ether of the class consisting of a free base and its mineral acid addition salts with a 1-p-nitrophenyl-2-aminopropane-1,3-diol of formula

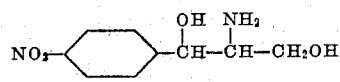

of the class consisting of a free base and its mineral acid addition salts, at least one of said dichloroacetimino alkyl ether and 1-p-nitrophenyl-2-aminopropane-1,3-diol being in the mineral acid addition salt form, in an organic solvent containing at least one equivalent of water compared to the amount of said diol at a temperature below about 50° C.

2. Process for the production of a 1-p-nitrophenyl-2-dichloroacetamidopropane-1,3-diol of formula

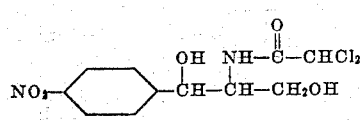

which comprises reacting a mineral acid salt of a dichloroacetimino lower alkyl ether with a 1-p-nitrophenyl-2-aminopropane-1,3-diol of formula

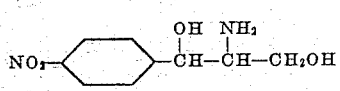

in an organic solvent containing at least one equivalent of water compared to the amount of said diol at a temperature below about 50° C.

3. Process for the production of DL-threo-1-p-nitrophenyl-2-dichloroacetamidopropane-1,3-diol which comprises reacting a mineral acid salt of a dichloroacetimino lower alkyl ether with DL-threo-1-p-nitrophenyl-2-aminopropane-1,3-diol in an organic solvent containing at least one equivalent of water compared to the amount of said diol at a temperature between 20 and 35° C.

4. Process for the production of D-(—)-threo-1-p-nitrophenyl-2-dichloroacetamidopropane-1,3-diol which comprises reacting a mineral acid salt of a dichloroacetimino lower alkyl ether with D-(—)-threo-1-p-nitrophenyl-2-aminopropane-1,3-diol in an organic solvent containing at least one equivalent of water compared to the amount of said diol at a temperature between 20 and 35° C.

5. Process for the production of L-(+)-threo-1-p-nitrophenyl-2-dichloroacetamidopropane-1,3-diol which comprises reacting a mineral acid salt of a dichloroacetimino lower alkyl ether with L-(+)-threo-1-p-nitrophenyl-2-aminopropane-1,3-diol in an organic solvent containing at least one equivalent of water compared to the amount of said diol at a temperature between 20 and 35° C.

6. Process which comprises reacting a mineral acid salt of a dichloroacetimino lower alkyl ether with 1-p-nitrophenyl-2-aminopropane-1,3-diol in an organic solvent containing from 1% to 20% by volume of water for at least several hours at a temperature below 50° C., removing insoluble material from the reaction mixture and concentrating the separated liquid to obtain a crystalline 1-p-nitrophenyl-2-dichloroacetamidopropane-1,3-diol.

7. Process which comprises reacting dichloroacetimino ethyl ether hydrochloride with 1-p-nitrophenyl-2-aminopropane-1,3-diol in ethanol containing 1% by volume of water for at least several hours at a temperature between 20° C. and 35° C., removing insoluble material from the reaction mixture and concentrating the separated liquid until it becomes a thick syrup and adding water to cause crystallization therefrom of 1-p-nitrophenyl-2-dichloroacetamidopropane-1,3-diol.

References Cited in the file of this patent

FOREIGN PATENTS

| | | |
|---|---|---|
| 499,947 | Belgium | Dec. 30, 1950 |
| 501,677 | Belgium | Mar. 31, 1951 |
| 501,678 | Belgium | Mar. 31, 1951 |
| 502,839 | Belgium | May 15, 1951 |
| 282,878 | Switzerland | Sept. 1, 1952 |